(No Model.)
G. L. GERARD.
TRUSS PAD.
No. 274,932. Patented Apr. 3, 1883.
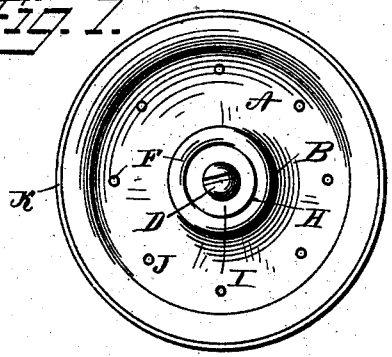
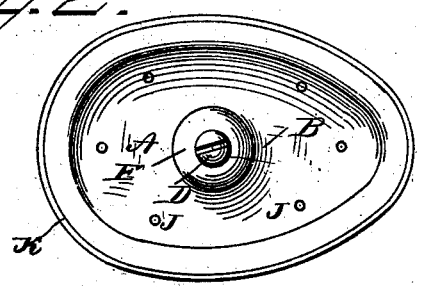
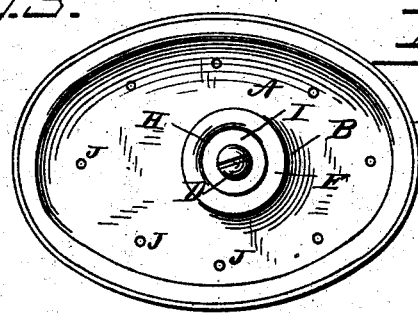
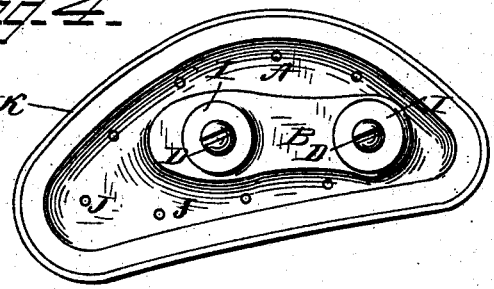
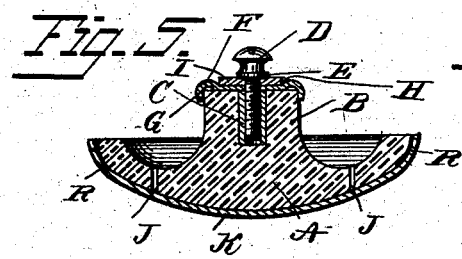
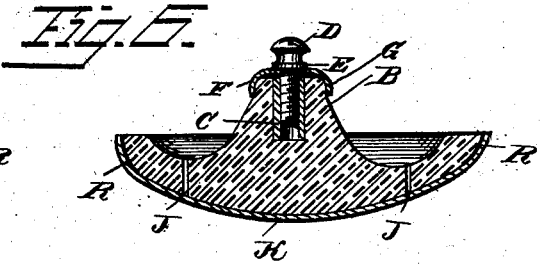
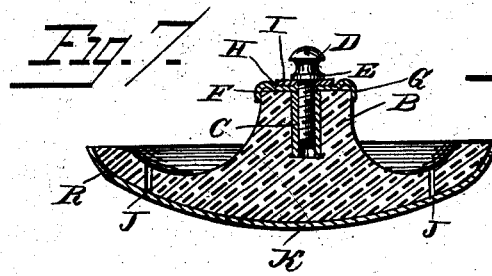
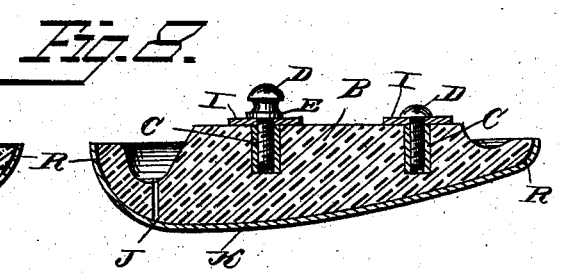
Witnesses:
F. L. Durand
J. R. Littell
Inventor:
Geo. L. Gerard,
by C. A. Snow & Co.
Attorneys.
N. PETERS, Photo-Lithographer, Washington, D. C.

UNITED STATES PATENT OFFICE.

GEORGE L. GERARD, OF NEW HAVEN, CONNECTICUT.

TRUSS-PAD.

SPECIFICATION forming part of Letters Patent No. 274,932, dated April 3, 1883.

Application filed August 25, 1882. (No model.)

*To all whom it may concern:*

Be it known that I, GEORGE L. GERARD, of New Haven, in the county of New Haven and State of Connecticut, have invented certain new and useful Improvements in Truss-Pads; and I do hereby declare that the following is a full, clear, and exact description of the invention, which will enable others skilled in the art to which it appertains to make and use the same, reference being had to the accompanying drawings, which form a part of this specification.

Figures 1, 2, 3, and 4 are plan views illustrating various forms of my improved truss-pad, and Figs. 5, 6, 7, and 8 are transverse sectional views of the same.

Corresponding parts in the several figures are denoted by like letters of reference.

This invention relates to truss-pads; and it consists in certain improvements in the same, which will be hereinafter fully described, and pointed out in the claim.

My improved truss-pad consists essentially of a convexo-concave shell having in its concave side a tapering stem, all formed in a single block or piece of soft vulcanized rubber.

In the several figures of the drawings I have shown pads of different shapes—round, oval, elliptical, and irregular—showing how the pads or shells may be made of any desired shape. The shell, which is denoted by letter A, has formed on its concave side a stem, B, tapering outwardly, as shown.

C is a screw-threaded bushing embedded in the outer end of the stem B to receive the fastening-screw D, which has a flange, E.

F is a washer interposed between the screw and the end of stem B, and provided with a flange, G, inclosing the end of said stem, so as to prevent it from spreading.

When the end of the stem B is oblong, as in Fig. 4, two or more fastening-screws and interposed unflanged washers may be used.

When, as in Figs. 1 and 3, a flanged washer is used, it may be made of thin sheet metal and provided in its upper side with a recess or depression, H, to receive an additional flat washer, I, of heavier material.

The body of shell A has perforations J surrounding the base of stem B for ventilating purposes.

The convex side of the shell may be provided with a covering, K, of chamois-skin or leather, secured to the edge of said shell only, as shown at R, so as not to clog the ventilating-openings.

The operation will be readily understood. The shell of the pad being thin and elastic, will yield readily to the body of the wearer. The pressure of the stem serves to keep the hernia in place.

I claim—

As an article of manufacture, the herein-described truss-pad, consisting of a concavo-convex shell of vulcanized rubber, having ventilating-openings J and chamois or equivalent cover K, and provided on its outer concave side with a tapering stem having a screw-threaded bushing, a flanged washer to keep the end of said stem from spreading, and a fastening-screw, as and for the purpose set forth.

In testimony that I claim the foregoing as my own I have hereto affixed my signature in presence of two witnesses.

GEORGE L. GERARD.

Witnesses:
HERBERT C. FULLER,
ABEL B. JACOCKS.